United States Patent [19]

Gordon, Jr. et al.

[11] 4,448,695

[45] May 15, 1984

[54] EFFLUENT WATER FILTER DEVICE AND METHOD

[76] Inventors: Edward C. Gordon, Jr.; Glen D. Gordon, both of 7475 SW. Cherry St., Tigard, Oreg. 97221

[21] Appl. No.: 350,373

[22] Filed: Feb. 19, 1982

[51] Int. Cl.³ .............................................. B01D 23/14
[52] U.S. Cl. .................................. 210/694; 210/807; 210/282; 210/284; 210/286; 210/287
[58] Field of Search .............. 210/266, 282, 284, 296, 210/337, 338, 330, 489, 264, 694, 807, 285–287, 289

[56] References Cited

U.S. PATENT DOCUMENTS

| | | | |
|---|---|---|---|
| 136,364 | 3/1873 | Conger | 210/266 |
| 3,202,286 | 8/1965 | Smit | 210/286 |
| 3,585,130 | 6/1970 | Gregory | 210/282 |
| 4,340,478 | 7/1982 | Stannard et al. | 210/286 |

*Primary Examiner*—Ivars C. Cintins

[57] ABSTRACT

An effluent water filter device and method comprised of a cellular grid packed with an activated carbon and enclosed in a housing. The cellular grid is formed of a bacteria retarding material such as stainless steel. The housing is formed of a frame having screens on either side and locking end cap rings. The filter pack may be in any shape either rectangular or cylindrical.

7 Claims, 2 Drawing Figures

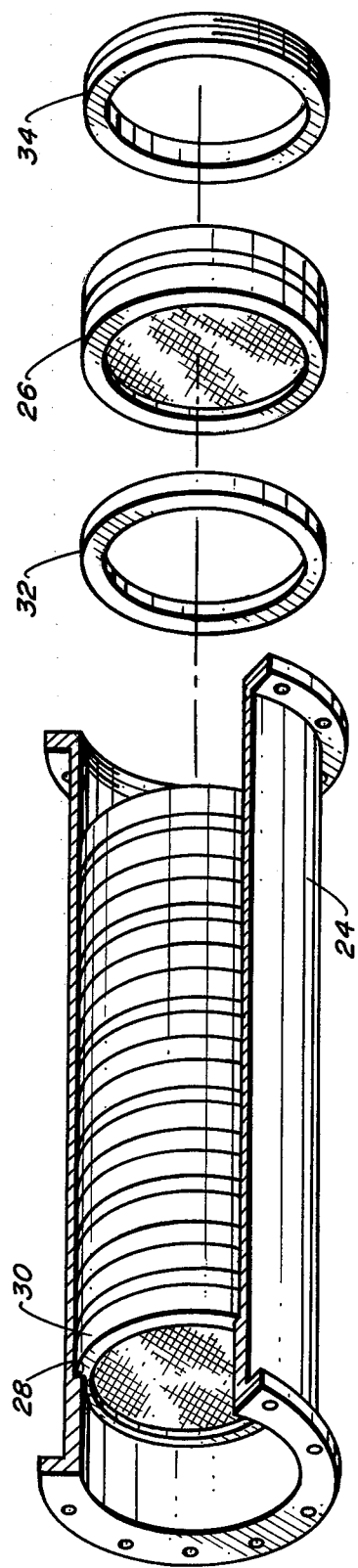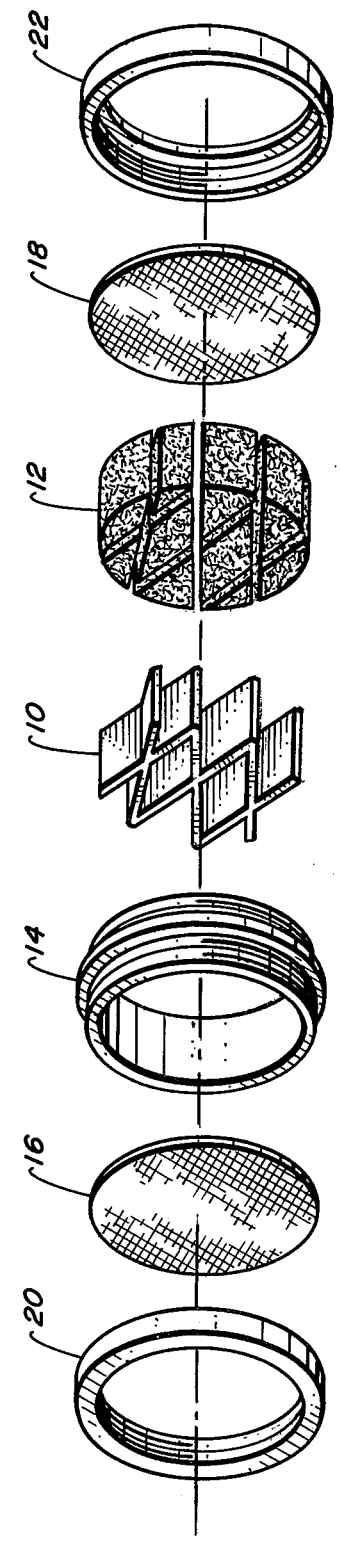

EFFLUENT WATER FILTER DEVICE AND METHOD

BACKGROUND

This invention relates to effluent water filtering systems and more particularly relates to an effluent water filter device, which is easy to install and maintain.

In present effluent water filtering systems, most suspended solids, bacteria and other organisms are filtered out by passing the water through a bed of sand sometimes layered on top of pulverized charcoal or through a matrix of fibrous materials. Some of these types of filters are known as "slow sand filters" and may range in size from a fraction of an acre in some small plants to several acres in large plants. The water is passed through these systems at a relatively low rate. The sand used in these filter systems is usually a fine sand, which clogs with use and thin layers of the dirty sand must be scrapped from the filter periodically to maintain capacity. The disadvantages of these types of filter systems, are the large area required in addition to the labor needed to clean the filters and handle the filter sand.

More often, the filtering systems presently in use are rapid sand filters, which is made possible by coagulation and sedimentation before filtration to remove the heaviest part of the load. These systems use a fairly coarse sand and include facilities for backwashing the filter to keep the bed clean. The filter beds are generally small ranging from 150 square feet in some small plants to 1500 square feet in larger plants. The filters themselves consist of a layer of sand or occasionally crushed anthracite coal up to two (2) feet deep resting on graded layers of gravel above an underdrain system. Maintenance of these systems is difficult and requires a great deal of labor. These type filters are generally built in concrete boxes or open tanks of wood and steel. The flow through the filter is generally by gravity or the water may be forced through the sand under pressure by pumping. However, excessive pressure frequently causes turbidity and bacteria may appear in the discharge water. Thus, pressure filters are not favored because they are difficult to inspect and keep in good order, thus, open gravity filters are favored for public water supplies. Even these, however, do not always filter out some of the harmful bacteria, carcinogens and cancer-causing agents.

SUMMARY

The purpose of the present invention is to provide an effluent water filtering device and system which is efficient and easily maintained.

In the filtering device of the present invention, a cellular grid is formed, which is then packed with an activated carbon. The packed cellular grid is then installed in a housing formed of a frame having screens at either end secured by locking end cap rings. The construction of the filter devices may be in any shape and size providing a unitary filtering system which can be easily removed, replaced and serviced conveniently.

The effluent water filter device described utilizes a stainless steel grid, which will retard formation of bacteria. The activated charcoal in the grid will remove harmful bacteria and carcinogens or cancer-causing agents or chemicals from the water. The water filter device of the present invention may be used but is not limited to conventional industrial water treatment plants. It is preferably used in final filtration process and may be used in aquaduct or feeder plants.

The packed cellular grid and housing are designed to make one filter device or pack. By proper positioning a plurality of these filter devices or packs, the filtering system may be easily expanded in length and size for various purposes. To provide a plurality of series installed filter packs a pipe section will be constructed having a shoulder or recess against which the filter packs will seat. This will generally hold the filter packs in position for flow through of water to be filtered. At the rear of the pipe section, a lock ring will clamp the plurality of series installed filter packs in the pipe section. Thus, the pipe section may be installed or removed from a water supply aquaduct or pipe line as desired. The filter packs for the pipe are cylindrical in design and easily slide into or out of the pipe for simplifying maintenance. As in prior filtering systems, the filter packs can be regenerated by simply back flushing the system or removing and replacing individual filter packs in the pipe. Thus, the device and system provided is readily reusable except in extreme cases where the activated carbon may be too saturated. In this event, the entire filter pack can be removed and pressure-steamed before it may be reused.

It is one object of the present invention to provide an effluent water filtering device, which can be easily removed and exchanged.

Another object of the present invention is to provide an effluent filtering device, which can be easily removed and exchanged.

Still another object of the present invention is to provide an effluent filtering device constructed of a cellular grid material which retards bacterial growth.

These and other objects of the invention become apparent from the following detailed description when considered in conjunction with the accompanying drawings wherein like reference numbers identify like parts throughout.

BRIEF DESCRIPTION OF THE DRAWINGS

FIG. 1 illustrates the construction of an effluent water filtering device according to the invention.

FIG. 2 shows the effluent water filtering device constructed for use in a water supply system.

DESCRIPTION OF THE PREFERRED EMBODIMENT

The water filtering device of the present invention consists of a cellular grid 10 which is packed or filled with an activated carbon material 12 enclosed in a housing. The housing is formed of a cylindrical ring or frame 14 having screens 16 and 18 on either end locked together by locking rings 20 and 22.

Preferably the cellular grid 10 is comprised of a bacteria-retarding stainless steel material such as stainless steel type 304 A.S.T.M. specification A-213. The frame 14 would also be constructed of this stainless steel.

The activated carbon 12 may be made to many different pure structures for a variety of water conditions. It may be a biologically activated carbon in a crystalline granular form desirable because of its efficient filtration properties. The screens 16 and 18 would be sufficient to allow a free flow of water through the filter while preventing the activated carbon 12 from washing out of the filter pack. While the filtering device or pack illustrated in FIG. 1 is cylindrical in shape, it can be rectangular or any shape desired. Likewise, the cellular grid 10 can be a circular, diamond or square-celled construction.

The use of the effluent water filtering device of the present invention is illustrated in FIG. 1. In FIG. 2 a section of pipe 24 may be provided in any desired diameter according to the water supply the system is to be used with. Installed in the pipe are effluent water filtering devices or packs 26 according to the invention, which are stacked or in series to provide maximum filtration. The pipe 24, in order to lock the filter packs within the pipe section, is provided with a recess or step 28 against which the furthest pack 30 seats. Additional packs would be loaded into the pipe section 24 separated by spacers 32. The entire assembly is then closed and sealed by a threaded locking ring 34. This entire filtering system may now be installed into the path of a water supply pipeline to provide effective filtering and purification of water.

The size of the grids 10 and density of the activated carbon 12 packed into the grids would depend upon the amount of flow desired. The cellular grids would be loosely filled with the activated carbon in order to minimize restriction to flow while at the same time providing maximum filtration.

Obviously, many modifications and variations of this invention are possible in the light of the above teachings. It is therefore to be understood that the full scope of the invention is not limited to the details disclosed herein, but only by the appended claims and may be practiced otherwise than as specifically described.

What is claimed is:

1. An effluent filtering system comprising:
   a pipe section;
   a plurality of filter pack means serially positioned in said pipe;
   said filter pack means comprising;
      grid support means having a plurality of cells;
      said cells being packed with granular carbon;
      ring means receiving said grid support means packed with granular carbon;
      a screen on each side of said ring means;
      locking end caps on each side of said ring means locking said ring means, screens and grid together thereby forming a filter pack assembly;
      said grid and ring means being formed of bacterial growth retarding stainless steel;
   securing means securing said plurality of filter pack means in said pipe section;
   connecting means for connecting said pipe section with said plurality of filter pack means in an effluent pipe whereby effluent is caused to flow through said series of filter pack means.

2. The effluent filtering system according to claim 1 in which said means for securing said filter pack means in said pipe section comprises a recess at one end and a cap ring secured to the opposite end.

3. The effluent filtering system according to claim 2 including spacer means between each of said filter pack means.

4. An effluent water filtering method comprising;
   forming a cellular grid from a bacteria retarding material;
   packing the cells of said cellular grid with carbon;
   enclosing said packed cellular grid in a screened housing;
   positioning a plurality of said carbon packed cellular grids in the path of water to be filtered.

5. The effluent filtering method according to claim 4 comprising forming said cellular grid from a bacteria retarding stainless steel.

6. The effluent filtering method according to claim 5 comprising packing said cellular grid with an activated carbon.

7. The effluent filtering method according to claim 4 comprising;
   positioning a plurality of carbon packed grids in series in a section of pipe;
   installing said section of pipe in a water supply pipeline.

* * * * *